United States Patent
Seligmann et al.

(10) Patent No.: US 9,756,083 B2
(45) Date of Patent: Sep. 5, 2017

(54) SYSTEM AND METHOD FOR CONTEXT-AWARE PARTICIPANT MANAGEMENT

(71) Applicant: Avaya Inc., Basking Ridge, NJ (US)

(72) Inventors: Doree Duncan Seligmann, New York, NY (US); Moni Manor, Santa Clara, CA (US)

(73) Assignee: Avaya Inc., Basking Ridge, NJ (US)

(*) Notice: Subject to any disclaimer, the term of this patent is extended or adjusted under 35 U.S.C. 154(b) by 448 days.

(21) Appl. No.: 13/756,615

(22) Filed: Feb. 1, 2013

(65) Prior Publication Data

US 2014/0222907 A1 Aug. 7, 2014

(51) Int. Cl.
*G06F 15/16* (2006.01)
*H04L 29/06* (2006.01)

(52) U.S. Cl.
CPC ........ *H04L 65/103* (2013.01); *H04L 65/1069* (2013.01); *H04L 65/4046* (2013.01)

(58) Field of Classification Search
None
See application file for complete search history.

(56) References Cited

U.S. PATENT DOCUMENTS

| | | | |
|---|---|---|---|
| 5,907,324 A * | 5/1999 | Larson | H04L 12/1822 715/751 |
| 6,687,338 B2 | 2/2004 | Seligmann | |
| 7,046,784 B2 | 5/2006 | Seligmann | |
| 7,336,779 B2 | 2/2008 | Boyer et al. | |
| 7,415,417 B2 | 8/2008 | Boyer et al. | |
| 7,421,072 B2 | 9/2008 | Brotman et al. | |
| 7,469,293 B1 * | 12/2008 | Yoakum | H04L 65/1006 709/227 |
| 8,107,401 B2 | 1/2012 | John et al. | |
| 8,176,086 B2 | 5/2012 | John et al. | |
| 8,180,722 B2 | 5/2012 | John et al. | |
| 8,270,320 B2 | 9/2012 | Boyer et al. | |
| 8,359,354 B1 * | 1/2013 | Do | H04M 7/006 379/201.01 |
| 2003/0053612 A1 * | 3/2003 | Henrikson | H04M 3/567 379/202.01 |
| 2004/0054726 A1 * | 3/2004 | Doss | G06Q 10/109 709/205 |
| 2005/0066001 A1 * | 3/2005 | Benco | H04L 29/06 709/204 |
| 2005/0207357 A1 * | 9/2005 | Koga | H04L 12/1813 370/260 |
| 2006/0085417 A1 | 4/2006 | John et al. | |

(Continued)

*Primary Examiner* — Younes Naji (57) ABSTRACT

System and method to manage an electronic conference hosted by a conference server coupled to a processor and a memory, the method including: receiving, by a communication interface of the conference server, a request from a user to participate in an electronic conference; determining, by the processor, resources needed by the user and resources needed by the electronic conference; determining resource contentions among resources needed by the user and resources needed by the electronic conference; collecting contextual information related to at least one of the user and resources needed by the electronic conference; and resolving, by the processor, contentions among resources needed by the user and resources needed by the electronic conference.

30 Claims, 2 Drawing Sheets

(56) References Cited

U.S. PATENT DOCUMENTS

| | | | |
|---|---|---|---|
| 2006/0182251 A1 | 8/2006 | Seligmann et al. | |
| 2007/0071203 A1 | 3/2007 | Boyer et al. | |
| 2007/0208806 A1* | 9/2007 | Mordecai | G06Q 10/10 709/204 |
| 2007/0280254 A1* | 12/2007 | Milstein | H04L 29/06027 370/395.2 |
| 2008/0207357 A1* | 8/2008 | Savarese | A63B 24/0021 473/407 |
| 2009/0044132 A1* | 2/2009 | Combel | G06Q 10/107 715/753 |
| 2009/0048893 A1* | 2/2009 | Wang | G06Q 10/1093 705/7.18 |
| 2009/0225153 A1* | 9/2009 | Shibuya | H04L 12/1813 348/14.13 |
| 2010/0220847 A1* | 9/2010 | Yap | H04M 3/56 379/202.01 |
| 2011/0209196 A1* | 8/2011 | Kennedy | G06F 21/55 726/1 |
| 2011/0271212 A1* | 11/2011 | Jones | H04L 12/1818 715/753 |
| 2011/0271332 A1* | 11/2011 | Jones | H04L 9/3247 726/7 |
| 2011/0307805 A1* | 12/2011 | Bastide | G06Q 10/10 715/753 |
| 2012/0030232 A1 | 2/2012 | John et al. | |
| 2012/0030244 A1 | 2/2012 | John et al. | |
| 2012/0030263 A1 | 2/2012 | John et al. | |
| 2012/0030292 A1 | 2/2012 | John et al. | |
| 2012/0030368 A1 | 2/2012 | John et al. | |
| 2012/0030682 A1* | 2/2012 | Shaffer | H04L 65/1076 718/103 |
| 2012/0036194 A1* | 2/2012 | Whynot | H04W 4/02 709/205 |
| 2013/0051543 A1* | 2/2013 | McDysan | H04M 3/4286 379/202.01 |
| 2014/0067455 A1* | 3/2014 | Zhang | G06Q 10/109 705/7.24 |
| 2014/0095615 A1* | 4/2014 | Ito | H04L 65/80 709/204 |

* cited by examiner

SYSTEM AND METHOD FOR CONTEXT-AWARE PARTICIPANT MANAGEMENT

BACKGROUND

Field of the Invention

Embodiments of the present invention generally relate to electronic meeting management, and, in particular, to a system and method for managing electronic meetings such that resource contention is mitigated.

Description of Related Art

Physical meeting rooms are sometimes used for back-to-back meetings. In this situation, people often mill around as one meeting is winding down and participants of the next meeting start arriving. In the real physical world, participants themselves figure out in an ad hoc manner what to do, potentially leading to awkward situations with participants of the second meeting unintentionally barging into the first meeting, or intentionally barging into the first meeting with the purpose of hastening the end of the first meeting.

A similar resource contention exists for virtual and/or electronic conferences (generically, "electronic conferences"). Often before a start of an electronic conference, participants are put into a state of limbo, and the entrance and/or departure of participants who may have back-to-back meetings is not elegantly managed, causing potential overlap of the meetings. For example, participants of back-to-back meetings using a same conference code may intermingle by mistake. Alternatively, while waiting for a moderator to activate a conference, participants are subject to wasted dead time (e.g., listening to music) prior to the meeting, which could be used for a more productive purpose.

One solution of the background art is to allocate separate resources for separate meetings. A host may use two separate bridges with different access codes for back-to-back meetings. The separate bridge acts as a holding place (i.e., a virtual waiting room or virtual lobby, etc.) for participants that are not yet allowed to join a session. Items of relevance to a meeting, such as documents, slide presentations, would be distributed to participants as attachments to a meeting invitation or related emails. Alternatively, a sharable storage location (e.g., a sharepoint) can be set up to store documents for the meeting.

Early virtual environment systems, built upon multimedia conferencing technology of the time, such as "PERSYST" (a virtual room platform and distance-learning environment), and the "Virtual Jazz Club," a.k.a. "VJC" (a session-based synchronous social network allowing end-users share multimedia streams), displayed a 2D representation of rooms and hallways and lobbies with shared display and audio and representations of participants. The VJC representation was partitioned into separate conversations (e.g., at virtual tables), with an ability to browse, be invited, join, make private, and so forth. What a participant heard was based on their level of participation and permissions.

Upon entering the environment in PERSYST, a user is placed a school hallway with "doors" to various virtual classrooms. Only virtual classrooms that were accessible to the user would be displayed. When it was appropriate (e.g., class about to begin, or class was in session), the virtual classroom doors would open to grant access to the virtual classrooms. Virtual classrooms not presently in use could be entered in order to browse through lecture notes, etc. The virtual classrooms were persistent places. A virtual classroom in session was similar to a multimedia conference with shared voice, video, documents, etc. In the Virtual Jazz Club users would first be presented with a room with individual tables, with each table representing a communication session. Some communication session could be completely private, other communication sessions could be "overheard" and the participants being displayed. A user could join a session only if a "chair" was available.

Some known systems such as the Avaya™ Web.alive™ virtual environment provide visual and spatial cues to enable participants to manage entering and leaving meeting rooms at the right time, just as they might in the real world. For example, if the room (physical or virtual) is still in use, participants or their avatars may wait outside or in a physical or virtual waiting room or lobby area. Facilitators may be present in either the physical or virtual world. A physical or virtual room may be stocked with materials related to the meeting. Access to a room may be locked until an appropriate time for conference participants to enter. Such virtual systems rely on the social actions of each participant to manage themselves, just as they would in the real world. Mistakes can still occur in the known virtual systems, just as they do in the real world, with people walking into a meeting room which another meeting is wrapping up.

Virtual world managers such as the Avaya™ Web.alive™ are able to manage what and how multimedia services and content are shared by participants. The virtual world manager may have lobbies and open places as well as closed and "locked" places designated for different meetings with human moderators and access codes.

In some systems of the known art that are usable with call centers, such as U.S. Pat. No. 7,336,779, a call center call queue may be used as a virtual holding room. For example, there may be created, identified and implemented multi-customer sessions, such that callers in a queue are bridged together in order to chat as the callers wait for an available service agent. For example, callers may be in queue waiting to speak to an agent. While the callers are waiting for their "session" with an agent to begin, a system can determine like interests and bridge various people together (to talk, IM chat, etc.) at the same time the callers are updated with information, such as: when their session will begin; identifying other sessions that might be of interest (e.g., a product training session that may be of interest to all users in the queue who own the same product, etc.); and so forth. These users may select to delay their interaction with an agent, and move down in the queue as they are engaged in this other activity. An agent with a different skill level is assigned to manage these group chats, and the agent's availability is used to schedule the group chats, for instance a user may be asked whether a training session can start in three minutes and whether the user would you like to join the training session. In another example, a voice chat could be arranged such that the agent can speak and hear everyone, but each participant would only hear the agent, or alternatively hear everyone.

In some systems of the known art that are usable with call centers, such as U.S. Pat. No. 7,415,417, a caller entering a queue is assigned a virtual agent that can gather more information, convey interesting information, and manage communication sessions while the caller is waiting. Callers may be grouped together based on various criteria and are granted access to resources and enabled to interact over different channels.

However, the known art does not fully determine and use contextual information in order to automatically manage the participants of an electronic conference, their access to services, their ability to interact with each other, in new ways; as well as using contextual information to interact directly with participants. Therefore, a need exists to provide access to and use of contextual information, in order to provide improved interactions associated with electronic conferences, and ultimately improved customer satisfaction.

SUMMARY

Embodiments in accordance with the present invention manage people, services, and objects associated with scheduled meetings before and after the actual meetings take place without changing the current methods for a participant to attempt to join a meeting. Embodiments provide a coupling or interaction among communications control, controlled access to content, controlled access to meeting data, and creation of virtual holding places.

Embodiments in accordance with the present invention provide a suite of context-aware methods, in order to ensure that participants are bridged together in a correct meeting. Embodiments further use context information to manage an electronic conference before and after the electronic conference, e.g., by partitioning or assigning participants into groups, granting group members access to specific services and content, and allowing group members to interact with each other.

Embodiments in accordance with the present invention may provide one or more of the following benefits with respect to the known art: the use of a single participant meeting code; managed access to active meetings even though more than one meeting may be on the same bridge with the same participant meeting code; gathering and use of external information to execute the managed access; determination and management of an extended participant state; creation and maintenance of virtual "holding places" or "waiting rooms" based on participant state; and managed access to services, content, and data from before and after the meeting regarding subjects such as access to a particular piece of information, the partitioning of participants into groups, and the enabling interaction between groups through another service.

Embodiments in accordance with the present invention improve upon the known art at least because they determine and use contextual information to automatically manage the participants, their access to services, their ability to interact with each other, in new ways; as well as using contextual information to interact directly with participants.

Embodiments in accordance with the present invention include a method to manage an electronic conference hosted by a conference server coupled to a processor and a memory, the method including: receiving, by a communication interface of the conference server, a request from a user to participate in an electronic conference; determining, by the processor, resources needed by the user and resources needed by the electronic conference; determining resource contentions among resources needed by the user and resources needed by the electronic conference; collecting contextual information related to at least one of the user and resources needed by the electronic conference; and resolving, by the processor, contentions among resources needed by the user and resources needed by the electronic conference.

Embodiments in accordance with the present invention include a method to receive alerts related to an electronic conference hosted by a conference server coupled to a processor and a memory, the method including: submitting, via a communication interface of the conference server, a request from a user to participate in an electronic conference; and receiving an alert related to a resource conflict of the electronic conference, wherein the resource conflict is determined by the processor based upon: resources needed by one or more participants of the electronic conference; resources needed by the electronic conference; and contextual information related to the one or more participants.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize contextual information to manage an electronic conference.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Figure 1:
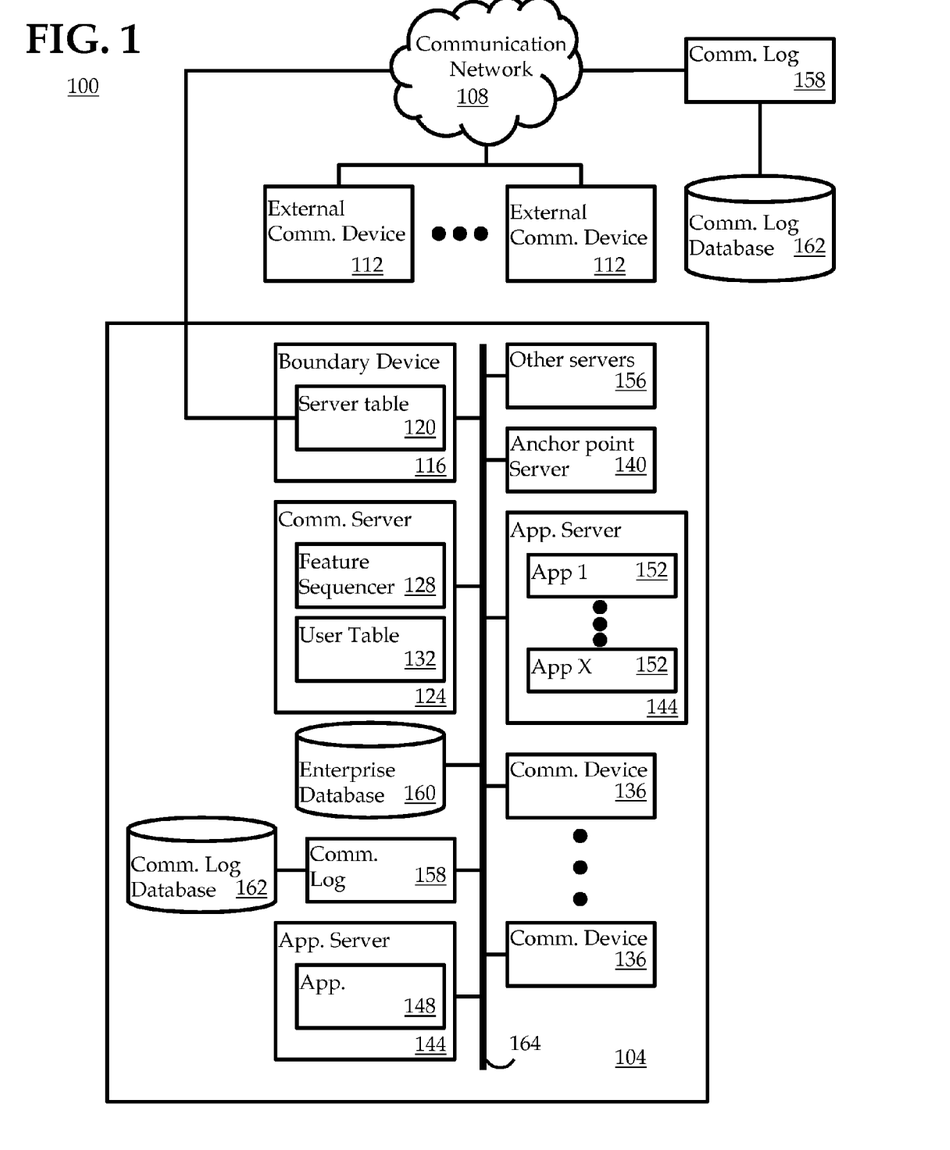
FIG. 1 is a block diagram depicting at a high level of abstraction a system in accordance with an embodiment of the present invention.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Multiple electronic meetings often are scheduled to use a single bridge at different times. Known systems and methods may manage access to the resource using a single access code (e.g., dial-in number, participant conference code, a calendar of scheduled meetings, etc.), but known systems and methods assume that the code is to be used at different times by different users, with scheduling information for the access code kept separately. Known systems and methods are generic and not robust, and fail to adequately handle a case when people connecting to the bridge to join a second meeting inadvertently are connected to a first meeting for which they were not invited to. Usage of a single bridge for conflicting meetings is an example of resource contention.

Known systems and methods do not address contention for a resource that, although reserved or desired for use during a period of time between a predetermined start time and predetermined stop time, may have flexibility in an actual start time and/or actual stop time for use. Known systems do not manage what people do when they are waiting in a customer care queue, other than providing music-on-hold, occasional waiting time alerts, providing an ability for callers in queue to interact with another caller, and/or engage with another agent in an alternate mode of communication before the callers are bridged to a call center agent.

The known background art fails to provide a comprehensive solution, drawn from detailed user contextual information, which approaches the problem of context-aware conference resource management as both a problem of managing access to a conference resource using information from another system, and as a problem of managing entities that are trying to access the conference resource. The known art may manage and grant access to some resources while access to and management of other conference resources is not granted. Such an ad hoc approach to resource contention is not suitable for electronic conferences.

Some known systems may allow a user to categorize a meeting (e.g. customer, business, etc.), but there is no integration between resources used by a meeting, such as a calendar, stored docs, and live communications.

Some known systems may provide a place-based communication tool that is accessed primarily through a mobile device and facilitates voice calls and text chat. "Place-based" refers to a physical space created by a group of people that have a shared context of that place (e.g., different parts of a workspace in a physical building, such as the machine shop, café, etc.). When a user calls any of these places, such systems may route their calls to all people who are "checked-in" to the place, but such systems fail to provide management of resources.

Some known systems may provide a presence-based or event-triggered "instant conferencing solutions," such that once the required participants are present and available, a communication session is established and the participants are connected to it. For example, a workflow may progress to a conference call only if certain criteria are met, such as collecting opt-ins from a required set of participants.

Embodiments in accordance with the present invention provide an improved system compared to known systems that use separate codes and resources for different meetings. Embodiments improve over the known systems for at least two reasons: First, there is less burden on the participants by using one code that must be remembered. Participants are likely to assemble often at meetings near the same virtual home and hence use the same familiar code. Second, a host and/or other required resources may be intended to be present at both meetings. A host, for example, may have a special role with respect to getting alerts, access to information, and managing aspects of the meeting, including when outside the meeting. In this situation, there is no advantage as to when the meetings will actually start, because the second meeting will have to wait until the host or required resource has finished supporting the first meeting.

Embodiments provide further advantages when applied to multiple services and resources. In some situations, the cost of setting up and tearing down sessions for a particular virtual meeting would be too expensive or time consuming if conducted in isolation for the particular virtual meeting, but may be feasible is adjacent to another virtual meeting because of, e.g., a relatively low incremental cost to extend the session from a first virtual meeting to an adjacent second virtual meeting.

Embodiments in accordance with the present invention may access alternative and/or non-traditional external sources of information regarding the electronic conference, participants of the electronic conference, and/or resources used by the electronic conference, in order to attempt to mitigate resource contentions among conflicting electronic conferences. Embodiments may also access information provided by or derived from the participants themselves. The alternative and/or non-traditional external sources of information may include contextual information as described below.

Embodiments in accordance with the present invention provide a context-driven system that uses contextual information to manage participants of different meetings that use shared resources. Participants may be managed before, during, and after the meeting itself. The shared resources may include, but not limited to, services used to conduct or support the meeting and information content accessed in relation to the meeting. The contextual information may be used to determine improved methods and channels to deliver information related to an electronic conference. The information may include an alert, resources used by the electronic conference, particularized communication channels to communicatively connect subsets of the participants of the electronic conference based upon a shared characteristic, etc.

The contextual information allows for advantages compared to the known art, such as improved management of the entry of participants into an electronic conference, improved management of communications media flows among participants, and improved utilization of persons who are scheduled to participate in an electronic conference (e.g., improved access to such persons, more efficient utilization of their time, and so forth). These advantages extend at least from initial scheduling prior to the start of the electronic conference, during the electronic conference itself, and afterward during post-conference wrap-up of the electronic conference. Context aware systems make use of event data (e.g., meeting data), communications logs, and so forth, to identify and rank objects that are related to (or have relevance to) a user's context. For example, a résumé of an interviewee may be a highly-rated object when the context is a job interview involving the interviewee. A highly-rated object would tend to be reviewed with little delay, e.g., a résumé might be reviewed while waiting for the job interview to start.

If search is enabled—ranking is used to order objects: In our echoes system we ranked people based on past communications history, importance in meetings, etc. Objects may include documents and previous correspondence, such as documents that are related to a meeting that is about to take place.

Contextual information may include an identity of a participant, title, decision-making role, group (including company) affiliation, prior involvement with the subject matter of the electronic conference, prior involvement with other participants of the electronic conference, venue, and so forth. Some types of identity may be self-supplied and some may be verifiable by use of external data sources (e.g., comparing voice samples, password usage, etc.). Contextual information may include a state of presence of a participant, identification of communication channels used by the participant, current activities (e.g., whether the participant is already connected to the electronic conference), calendar information about the participant (e.g., list of scheduled meetings), organization directory information, and so forth.

Contextual information may also include a relatively fine-grained (i.e., detailed) representation of the context of substantially every object in an electronic conference. For example, a coarse-grained presence indicator may indicate only whether a person is participating in an electronic conference or not, whereas a fine-grained presence indicator may also indicate which modalities (i.e., communication modes, including device and network information) the person is using in order to participate in the electronic conference. Fine-grained contextual information may be used to make more informed automated decisions.

A more elaborate rule enabled by fine-grained information may also take into account whether a participant in the electronic conference has or has not downloaded a file and has a terminal device that allows him to view it. In another example, fine-grained identity that includes title, position, role in this meeting, capabilities (authorizations) etc., may enable starting a meeting only when required persons are available, e.g., do not start an electronic conference that involves signing a contract until someone there has the authority to approve or sign the contract is available.

Objects may include individual participants, the resources participants use (e.g., documents), resource dependencies (e.g., if a particular document is to be discussed, the document author must be available), interactive sessions (or identifiers of such sessions) they are associated with, and so forth. Objects will be identified, and represented with characteristics such as fine-grained presence, roles, and associations. For example, suppose the object is a latest working draft of an IETF RFC document (or comments thereto), and the electronic conference pertains to discussing the draft document. Whether a particular participant is allowed to edit the document may be determined by whether the object is associated with a group that the particular participant is a member of, or whether editing the document requires certain processing or communication resources that are available to the particular participant, and so forth. Presence may include a status indicator that conveys ability and willingness of a participant or other potential communication partner to communicate. Presence information may include a listing of the best communication method to be reached (e.g., phone, text message, instant messaging, etc.), or best location (e.g., office phone, home phone, mobile phone, etc.), and so forth. Roles and/or associations of participants may include an identification of an employer of the participant, what groups the participant belongs to, what devices, networks and/or media the participant may need to access in order to participate in the electronic conference, what meetings the participant are associated with (e.g., ownership, permission levels, etc.).

For example, a fine-grained user state may represent varying degrees of participation in a present electronic meeting, as indicated by indicators such as presence, availability, communication capability, and so forth. A degree of participation may indicate whether the user is waiting to join a particular meeting, whether the user is not fully participating in the meeting (e.g., if the user is participating in an audio media stream but not a video media stream), and so forth.

Contextual information may be gathered and/or inferred for substantially every object used or referred to in the electronic conference. The contextual information, or information used to infer the context, may be gathered from sources such as: 1) Directly from the user, such as from an identity ("ID") code or observation of interactions of users with other users or the electronic environment; 2) Through one or more external data sources, such as a task calendar, a directory, presence servers, a tagging system, a conferencing systems, etc.; 3) Through analytic models and inference from other information (e.g., caller ID or other terminal identifier, email address, name, conference code, etc.). Analytic models and inferences may include, e.g., inferring location based on IP address rather than that inferring location based on a most recent "check-in" post by that user in social media; or inferring that someone is in car based on a speed of changing location. Presence and other contextual information may be gathered by a presence server. A presence server may be implemented as a server such as application server 144 illustrated in FIG. 1. Contextual information may be stored in a memory such as database 160 illustrated in FIG. 1. Additional examples of models and inferences may be found within U.S. Pat. No. 8,180,722, the content of which is hereby incorporated in its entirety.

Embodiments in accordance with the present invention may be able to associate a participant with a specific event, e.g., attendance at a prior conference, and then use fine-grained information regarding the user state, the presence, the availability, the communication capabilities, etc. to permit and manage the electronic conference and access to resources used by the present electronic conference. For example, if the participant did not attend a prior conference, additional information such as recordings or meeting minutes may be made available.

Embodiments in accordance with the present invention may provide configurable management of conference resources, such as access to participant schedules, documents related to the electronic conference, control of and/or access to the documents, and so forth. For example, for a conference bridge with a single participant access code, embodiments in accordance with the present invention may use calendar information for more fine-grained control of access to the conference bridge (e.g., controlling the access time and invitees). Certain other participants may be placed into a "waiting state" using additional information and policies to grant them access to services, objects (e.g., a folder of documents) and meeting data including that of an immediately previous meeting that is running late (e.g., by 5 minutes) and is therefore affecting the present meeting.

Embodiments in accordance with the present invention may provide data access with other systems, such that certain embodiments may be more robust since they can drawn from, or provide access to, information from external systems. When information is not available automatically, embodiments may interact directly with the participants in order to obtain the necessary contextual information (e.g., participants' identity, meeting identity, etc.) and use that contextual information to manage the participants and their access to services and objects related to the conference bridge.

Embodiments in accordance with the present invention may provide new states of participation in an event, before and after the event actually takes place. For examples of states of participation, a participant may participate remotely rather than in-person, or may participate by one or more of several communication modes (e.g., voice call, video call, web conference, etc.). Contextual information may be used to better select the state of participation (e.g., voice call if driving, web conference if at a desktop, etc.).

In another example, suppose a participant is invited to a meeting that has been set tentative at a predetermined time. Further suppose that the participant is also participating in another meeting that is known to the system. Embodiments in accordance with the present invention may use contextual data to drive what it does, e.g., 1) current activity status 2) role status (I'm the presenter at this upcoming meeting 3) I've accepted the invitation—or I'm sending a surrogate . . . etc in an event, before and after the event actually takes place.

This allows embodiments to provide new capabilities to virtual participants, e.g., treat waiting virtual participants differently, so that a virtual participant can be a stand in for a real participant, with the virtual participant participating in order to monitor the electronic conference and report back to a corresponding real participant regarding what is going on, who is there, and so forth. Or, the virtual participant may moderate and interact with other participants (real or virtual), may inform other participants when the real participant is expected to arrive, any special needs, etc. The electronic conference may commence using the virtual participant or may wait for the real participant to arrive. Embodiments may treat virtual participants differently from one another based on their roles and identity, and so forth, and permitted access to information.

Embodiments may also provide a mechanism to create and manage access to persistent data and objects related to specific meetings, based at least in part on a state of a participant of the specific meetings. Data and objects may be persistent at least because their context is preserved from one instance of an electronic conference to another instance of an electronic conference. Context may include, for example, values of variables, values of attributes of objects, class memberships, hierarchical relationships, the state of a stateful process, and so forth. Compared to the known art, embodiments in accordance with the present invention provide feature-rich interaction between waiting participants, and also enable more control over distribution and more awareness of associated content objects and meeting information before and after a meeting.

During a pre-conference phase, embodiments in accordance with the present invention may assign or partition (generically, "partition") into separate groups or virtual waiting rooms any participants who attempt to access the electronic conference before the scheduled start time of the electronic conference, i.e., waiting participants. Partitioned participants may be granted different levels of access permissions and preferences. Embodiments may also provide that when a late-running electronic conference conflicts with the start of a next electronic conference, the participants of the scheduled conference may wait in a virtual waiting room until the conclusion of the late-running conference, or the late-running conference may be transitioned to a virtual side-room in order to allow the scheduled conference to begin.

The partitioning of the waiting participants into groups may be based upon commonality of certain predetermined characteristics. Waiting participants of a same group may freely interact with each other and access certain resources related to the electronic conference, and may interact to a more limited extent with waiting participants in other groups. Interactions within the same group may be designated as private within the group (e.g., not shared outside the group). Waiting participants may be offered a capability to review materials related to the electronic conference, to identify participants who have already checked into the electronic conference, expected participants who have not yet checked into the electronic conference, persons not invited to the electronic conference but who should be an invited participant, and so forth.

Embodiments in accordance with the present invention provide management of participants and resources associated with electronic conferences, including access permissions and notifications, based upon contextual information such as the current status of participants, their activities, identities and affiliations, status of groups of participants, status of the electronic conference itself, and so forth, for the present electronic conference and other electronic conferences they may be involved with or should be involved with. The context-aware management may also include direct interaction, alerting, and so forth, and may include one or more of the following functions: determining a need for a user interaction using alerts; determining a content of the user interaction using alerts; and determining a delivery method, media, mode, channel and so forth for the user interaction using alerts. Context-aware management functions are not limited to these examples and may include other management functions.

For an example of context-aware management of resource access and interaction between participants, suppose a first participant and a second participant are scheduled to attend a first web conference that is scheduled to start at 1:00 pm. Both participants plan to use voice, video, and web, and have called into a voice bridge using a mobile device. Both participants are employees of the same company, and have access to private communication services in order to communicate with other employees of their company who may also be participating in the web conference and to access documents proprietary to their employer. In addition, suppose that the second participant (but not the first participant) is further supporting a second web conference using a desktop computer. The context-aware management will recognize these relationships and, if so provisioned, may partition participants into groups according to access, permissions, preferences, etc. so that the first and second participants to have access to each other and to relevant company documents while waiting for the electronic conference to begin. For example, prior to the start of the web conference, first and second participants may be grouped together because of their mutual company affiliation, in order to provide first and second participants with access to each other via a separate mode of communication and to provide certain services to them (e.g., voice communication), and provide them with access to certain objects (e.g., documents). At a time when certain condition(s) are met (e.g., when the previous web conference on the same bridge has ended), or when a designated person such as a meeting moderator commands it, all of the participants will be bridged together.

Further suppose there is a third participant who is a moderator for the first web conference and who is also participating in the second web conference. Further suppose that the third participant is employed by company "B". Embodiments in accordance with the present invention will recognize these relationships and, if so provisioned, may allow the third participant to have communications access to all the other participants from company B, regardless of whether they are present in the second conference. The third participant also has access to participants in both the first and second conferences, and access to information that is relevant to the conferences, whether from company "A" or company "B".

In general, an electronic conference may have one or more levels of data sharing, such as: (1) public resources to be shared; (2) semi-public resources shared only among members of a group such as company employees or invited participants; and (3) private resources that are not shared at all other than with the owner of the resource. Furthermore, participants in an electronic conference may have one or more levels of permitted access, such as: (1) access to all conference resources and all actions; (2) access only to certain pre-determined resources, classes of resources, or actions (e.g., read-only, or read/write); and (3) no access except to the personal resources of the participant. A particular resource may be shared with a particular participant if the level of data sharing for the particular resource is compatible with the level of permitted access for the particular participant.

Accesses and permissions are not necessarily unilateral. For example, participant "B" may have complete access to resources belonging to participant "C" (e.g., a profile, communication modes, documents etc.) while C does not have complete access to resources belonging to participant B (e.g. a job interview).

Embodiments in accordance with the present invention may gather contextual information from internal and/or external sources, repositories and services, i.e., the embodiments are open systems, not closed systems. External communications services may be used and controlled in a context-aware manner by the system, in order to manage the contextual information, communication services, and information sources. For example, the system may bridge participants together with shared resources in an alternative manner (e.g., by using different communication methods, channels, and so forth) before and after a main meeting occurs. For example, the system may receive information from an external presence indicator that a particular person has entered a building, and then use that information in order to issue an alert to a predetermined participant of a meeting that the particular person has entered the building. Such information could be used to attempt to extend the meeting to the particular person.

In an example of context-aware management functions, a particular participant may be alerted when certain events occur, e.g., when all of the required participants from a particular company are present in the meeting; when a subset of the required participants from the particular company are present (e.g., decision-makers like certain upper management); when certain participants from other companies are present in the meeting; and so forth. Alerting may also include: setting, monitoring, and executing trigger conditions; determining whether or not there is a need for an alert; what the contents of the alert should be; and how the alert should be delivered. Embodiments provide an advantage over known systems that may provide an audio alert over an electronic conference to announce who is connected to the electronic conference, but which may miss notifying participants who are connected to the electronic conference by other communication channels such as web video.

Embodiments in accordance with the present invention may provide different levels of notification and alert, depending on roles of the participants, wherein the roles of the participants are determined by contextual information. For example, a person participating in a first electronic conference that is running late and who is an expected participant of a second electronic conference may alert other participants of the second electronic conference that they are running late. Furthermore, when participants of the second electronic conference log in, a notification may be sent to persons who are still participating in the first electronic conference and have not yet joined the second electronic conference. Such notifications may be made via communications channels associated with the first electronic conference. Other exemplary scenarios are possible.

Embodiments in accordance with the present invention may provide alerts or other notifications in-channel or out-of-channel. For example, in-channel notifications to a participant of a meeting may be made through a communications resource of that meeting, e.g., as a whisper notification over a conference bridge for the meeting, or through a private message capability in the web conference for the meeting, and so forth. By this way, alerts or notifications are delivered via a communication channel presently being used by or accessible to the target of the alert or notification. Out-of-channel alerts may use a communication channel that is or will not necessarily be used by the electronic conference. By using either in-channel and/or out-of-channel communication paths, a participant who is scheduled to participate in two consecutive electronic conferences may be able to receive through a communication channel used by the first electronic conference, alerts related to the second electronic conference, regardless of whether or not the second electronic conference is scheduled to use the same communication channel. Since the alerts may be provided via either in-channel or out-of-channel, the communication path of the alert is independent of a media path of the electronic conference.

Embodiments in accordance with the present invention may support multiple modes of a meeting, i.e., such embodiments are multimodal. An example of multiple modes would be usage of different communication channels to communicate with participants or potential participants. For example, an alert may be issued using a separate system (e.g., SMS text alert), or an alert may be issued within an active session of the same system (e.g., a voice connection in a separate call). In another example of multimodality, a participant of a meeting may send an email or instant message ("IM") to an internal team using systems not part of the conferencing system. Whether or not additional modes may be available to communicate with a particular participant may be determined from the context information associated with that participant. For example, a mobile communication mode is not available if the participant's presence indicates that their mobile phone is out of range, has a dead battery, or otherwise is not available.

Embodiments in accordance with the present invention may provide automatic creation and assignment of virtual agents to monitor, mediate, and manage users and meetings. Such agents may be used, e.g., to help avoid or mitigate resource contention.

Figure 2:
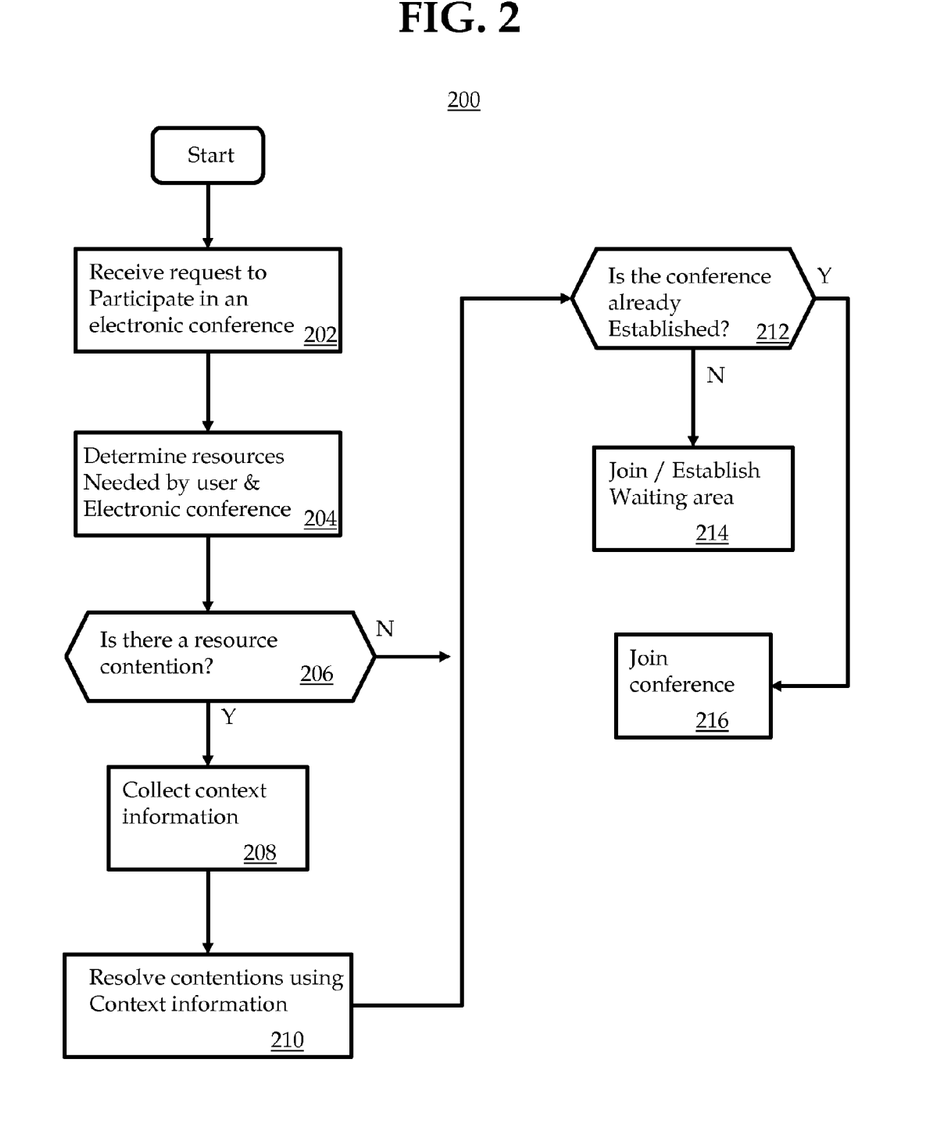
FIG. 2 illustrates at a high level of abstraction a process in accordance with an embodiment of the present invention.

FIG. 2 illustrates a process 200 in accordance with an embodiment of the present invention. Process 200 begins at step 202, at which an electronic conferencing system receives a request from a user to participate in an electronic conference. The electronic conference may be hosted by a system such as system 100 of FIG. 1, and implemented by one or more application 148 or a set of different applications 152 hosted on application server 144. The user may communicate with system 100 via external communication device 112. The request from the user may be received by a receiver or other communication interface such as boundary device 116 of FIG. 1.

Process 200 then proceeds to step 204, at which a processor, such as a processor inherent to application server 144, may determine what resources are needed by the user and/or by the electronic conference. For example, the electronic conference may need a conference bridge and related communication resources, and a user may need access to certain documents or communicative access to certain other participants of the electronic conference. Optionally, context information may be accessed at this point (not illustrated in FIG. 2) in order to help determine what resources are needed. For example, context information may help determine a scope of document access that is needed by a user, or communication modes that a user will need.

Process 200 then proceeds to decision step 206, at which a processor (not necessarily the same processor) may determine if there is contention among the needed resources. If there is no contention, process 200 may proceed directly to step 212.

If the outcome of decision step 206 is positive, then control of process 200 continues to step 208, at which context information is collected. The information may be collected from a wide variety of sources such as alternative and/or non-traditional external sources of information regarding the electronic conference, participants of the electronic conference, and/or resources used by the electronic conference. Collected information may be stored in a memory such as database 160 in preparation for later usage.

Process 200 then proceeds to step 210, at which the information collected at step 208, and which may be stored in a memory such as enterprise database 160, is used by a processor (not necessarily the same processor as used in earlier steps of process 200) in order to attempt to mitigate resource contentions among conflicting electronic conferences. Potential solutions to resource conflict may include rescheduling (e.g., postponing) the electronic conference, utilizing additional resources (e.g., providing a virtual waiting room for early-arriving participants), using alternate resources (e.g., communicating via mobile phone rather than through a wired Ethernet connection), and so forth. Alternatively, an authorized participant such as a conference host may override the resource conflict and proceed with the electronic conference.

Process 200 then proceeds to decision step 212, at which system 100 may determine whether the electronic conference has already been established. If the result of decision step 212 is that the electronic conference is already established, then control of process 200 passes to step 216 at which the user joins the electronic conference. If the result of decision step 212 is negative, then control of process 200 passes to step 214 at which temporary provisions are provided, such as usage of a temporary virtual waiting area, usage of secondary or non-preferred resources, and so forth.

Embodiments of the present invention include a system having one or more processing units coupled to one or more memories. The one or more memories may be configured to store software that, when executed by the one or more processing unit, allows practicing embodiments in accordance with the present invention, at least by use of processes described herein, including at least in FIG. 2, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to manage an electronic conference hosted by a conference server comprising a processor and a memory, the method comprising:

receiving, by the conference server, a request from a user to participate in the electronic conference;

determining, by the conference server, user resources to provide to the user for the electronic conference and communications resources for implementing the electronic conference;

determining, by the conference server, first resource contentions among the user resources and second resource contentions among the communications resources;

collecting, by the conference server, contextual information related to the communications resources and the user, wherein the contextual information related to the communications resources comprises information not related to availability of the communications resources; and resolving, by the conference server, the first resource contentions and the second resource contentions, by use of the contextual information.

2. The method of claim 1, wherein the user resources comprise information content accessed in relation to the electronic conference.

3. The method of claim 1, wherein the user resources comprise services used by the user to participate in the electronic conference.

4. The method of claim 1, wherein resolving the first resource contentions and the second resource contentions comprises managing entry of the user into the electronic conference.

5. The method of claim 1, wherein resolving the first resource contentions and the second resource contentions comprises managing communication media flows between the user and one or more additional users participating in the electronic conference.

6. The method of claim 1, wherein resolving the first resource contentions and the second resource contentions comprises scheduling of the user and one or more additional users participating in the electronic conference.

7. The method of claim 1, wherein the contextual information comprises an identity of the user.

8. The method of claim 1, wherein the contextual information comprises a state of presence of the user.

9. The method of claim 1, wherein the contextual information comprises previous activities by the user, the previous activities being related to the electronic conference.

10. The method of claim 1, further comprising collecting, by the conference server, contextual information related to the user resources, wherein the contextual information comprises a resource dependency of the user resources.

11. The method of claim 1, further comprising deriving, by the conference server, the contextual information from a data source external to the electronic conference.

12. The method of claim 1, further comprising deriving, by the conference server, the contextual information from an analytic model and an inference based on a data source external to the electronic conference.

13. The method of claim 1, further comprising providing, by the conference server, configurable management of at least one of the user resources or the communications resources.

14. The method of claim 1, further comprising providing, by the conference server, management of persistent data objects related to the electronic conference.

15. The method of claim 1, further comprising providing, by the conference server, a plurality of virtual waiting rooms to the user and one or more additional users until the first resource contentions and second resource contentions are resolved.

16. The method of claim 15, further comprising assigning, by the conference server, the user and at least one of the one or more additional users to a virtual waiting room based on commonality of a predetermined characteristic shared by the user and the at least one of the one or more additional users.

17. The method of claim 15, further comprising:
providing, by the conference server, a first predetermined level of access to one or more of the user resources or communications resources to users within a same virtual waiting room;
and providing, by the conference server, a second predetermined level of access to the one or more of the user resources or communications resources to users in a different virtual waiting room.

18. The method of claim 1, further comprising providing, by the conference server, an alert to the user, the alert related to the electronic conference.

19. The method of claim 18, wherein the alert is provided via a communication channel used by the electronic conference.

20. The method of claim 18, wherein the alert is provided via a communication channel that is independent of the electronic conference.

21. The method of claim 1, wherein the communications resources comprise multiple communication modes.

22. The method of claim 1, further comprising providing, by the conference server, to a host of the electronic conference, an alert of a status of a predetermined user.

23. The method of claim 1, further comprising:
receiving, by the conference server, a request from the user to stop participation in the electronic conference; and
releasing, by the conference server, the user resources and the communications resources used by the user.

24. The method of claim 23, further comprising providing, by the conference server, to a host of the electronic conference, an alert regarding a quantity of users presently participating in the electronic conference.

25. The method of claim 1, further comprising providing, by the conference server, a status of the electronic conference to another electronic conference.

26. The method of claim 1, further comprising partitioning, by the conference server, the user and one or more additional users of the electronic conference based on a shared characteristic of the user and the one or more additional users.

27. The method of claim 1, further comprising:
collecting, by the conference server, contextual information related to the user resources;
and providing, by the conference server, an alert to a predetermined user associated with the electronic conference, the alert being based on a change in the contextual information related to a particular one of the user resources or the communications resources.

28. The method of claim 1, further comprising:
inferring, by the conference server, unavailability of a particular user resource, wherein the inference is based on the contextual information related to the user; and
providing, by the conference server, an alert to a predetermined user associated with the electronic conference, the alert based on the inferred unavailability of the particular user resource.

29. The method of claim 28, further comprising overriding, by the conference server, based on an instruction received from the predetermined user, one or more of the first resource contentions or the second resource contentions.

30. A method to receive alerts related to an electronic conference hosted by a conference server comprising a processor and a memory, the method comprising:
submitting, by a user device to the conference server, a request from a user to participate in the electronic conference; and
receiving, by the user device from the conference server, an alert related to a resource conflict of the electronic conference, wherein the resource conflict is determined by the conference server based on:
user resources to be provided to one or more participants of the electronic conference;

communications resources for implementing the electronic conference; and contextual information related to the one or more participants, the user resources, and the communications resources, wherein the contextual information related to the communications resources comprises information not related to availability of the communications resources.

* * * * *